United States Patent [19]

Sugiyama et al.

[11] Patent Number: 5,768,642
[45] Date of Patent: Jun. 16, 1998

[54] METHOD AND APPARATUS FOR MAGNETIC RECORDING AND REGENERATION

[75] Inventors: Naoshi Sugiyama; Masaaki Orimoto; Makoto Nakazawa, all of Asaka, Japan

[73] Assignee: Fuji Photo Film Co., Ltd., Kanagawa, Japan

[21] Appl. No.: 805,277

[22] Filed: Feb. 27, 1997

Related U.S. Application Data

[63] Continuation of Ser. No. 466,891, Jun. 6, 1995, abandoned.

[30] Foreign Application Priority Data

Jul. 14, 1994 [JP] Japan ................................ 6-162215
Sep. 1, 1994 [JP] Japan ................................ 6-208679

[51] Int. Cl.$^6$ .................................................. G03B 17/24
[52] U.S. Cl. ........................................ 396/319; 396/311
[58] Field of Search .............................. 396/310, 311, 396/315, 319, 320, 392, 406–410

[56] References Cited

U.S. PATENT DOCUMENTS

| | | | |
|---|---|---|---|
| 4,864,332 | 9/1989 | Harvey | 354/21 |
| 4,885,599 | 12/1989 | Goto et al. | 354/173.11 |
| 4,977,419 | 12/1990 | Wash et al. | |
| 5,130,728 | 7/1992 | Goto et al. | 354/105 |
| 5,187,518 | 2/1993 | Kitagawa | 355/40 |
| 5,344,730 | 9/1994 | Kitamoto | 430/14 |
| 5,422,694 | 6/1995 | Yoshida et al. | 354/106 |
| 5,450,149 | 9/1995 | Cocca | 354/106 |
| 5,493,355 | 2/1996 | Kazami | 354/106 |
| 5,504,549 | 4/1996 | Kazami et al. | 354/173.1 |
| 5,526,084 | 6/1996 | Kataoka et al. | 354/275 |
| 5,530,503 | 6/1996 | Takahashi et al. | 354/173.1 |
| 5,539,484 | 7/1996 | Wakabayashi | 354/21 |
| 5,559,568 | 9/1996 | Kazami et al. | 354/106 |
| 5,600,385 | 2/1997 | Takeshita | 396/319 |
| 5,652,931 | 7/1997 | Kazami | 396/319 |

FOREIGN PATENT DOCUMENTS 4-134341 5/1992 Japan.

*Primary Examiner*—Safet Metjahic
*Assistant Examiner*—John Chizmar

[57] ABSTRACT

At first, the film in a film cartridge is wound up. Next, the film is rewound into the film cartridge, and a perforation indicating a reference position of each frame is detected. Then, predetermined information corresponding to the detected perforation is recorded in the magnetic layer. In another embodiment, when the perforation provided closest to the forward end of the film is detected, the film is rewound a required length. Then the magnetic recording is performed after the rewinding is completed. In another embodiment, two detectors for detecting a perforation is provided. One detector is apart from the other by a multiple of a distance between frames. Every time one detector detects a perforation, magnetic recording/regenerating is carried out.

20 Claims, 7 Drawing Sheets

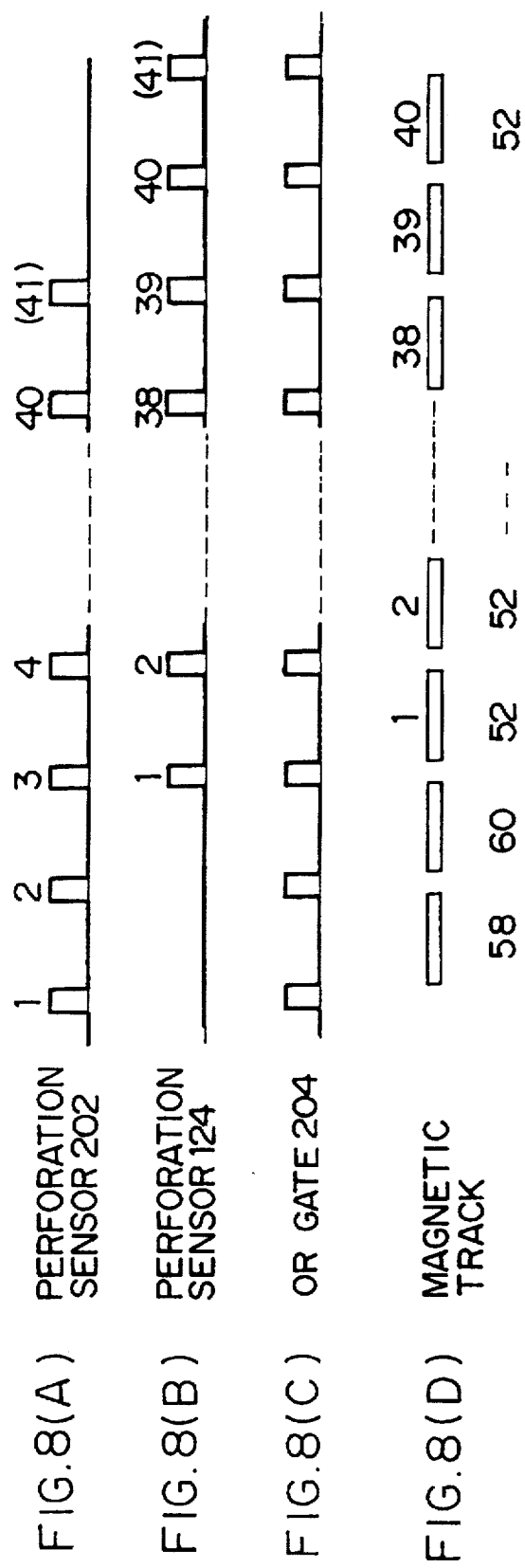

METHOD AND APPARATUS FOR MAGNETIC RECORDING AND REGENERATION

This application is a continuation of application Ser. No. 08/466,891 filed on Jun. 6, 1995, now abandoned.

BACKGROUND OF THE INVENTION

1. Field of the Invention

The present invention relates to a method of magnetic recording and regeneration and an apparatus for use in such a method and more particularly to a method and an apparatus for magnetic recording and regeneration for a photographic film which has a magnetic layer.

2. Description of the Related Art

There is a conventional method of controlling a photographic film conveyance in which one perforation is formed in each frame of the film and a frame is accurately positioned to be photographed by detecting the perforation (Japanese Patent Application Laid-open No. 4-134341).

And, in U.S. Pat. No. 4,977,419, there is disclosed a photographic film in which the perforation formed in each frame is used for detecting the position of a frame. Moreover, it is disclosed that a magnetic layer is formed on the photographic film by coating a transparent magnetic substance, and information relating to a frame (a frame number, a title, a print format, the date and time of photographing, the number of prints ordered, etc.) is recorded in the magnetic layer.

The perforation which indicates a position of each frame is used when each frame is positioned to be photographed, but the Japanese Patent Application Laid-open No. 4-134341 fails to disclose the use of the perforation in order to record the information relating to a frame in a record region corresponding to the frame.

Also, the information is recorded in the magnetic layer of the film when the film is fed from the film cartridge. Therefore, in the case that the perforation is detected and then predetermined information is recorded in accordance with the detecting position, there is a problem in that the information cannot be recorded in the magnetic layer in the forward end portion of the film where the perforation is not formed. Accordingly, if information relating to the whole film is recorded in the forward end portion of the film where a film image is not recorded, the magnetic layer of the film can be effectively used.

SUMMARY OF THE INVENTION

According to an embodiment of the present invention, the film is conveyed in the rewinding direction, and the perforation corresponding to each frame is detected, and various information is recorded in a predetermined part of the magnetic layer in accordance with a detected position of the perforation. This recording procedure is applied to the forward end portion of the film as well as other parts of the film. Therefore, magnetic information can be recorded in a predetermined part of the magnetic layer in the forward end portion of the film.

In another embodiment of the present invention, the film is conveyed in the feeding direction and the perforation of the film is detected by a first detector means. When the perforation which is closest to the forward end of said photographic film is detected, the film is rewound up to a predetermined position. Sufficient information can be recorded in the magnetic layer between this predetermined position and the perforation which is closest to the forward end of the film. Then, the photographic film is fed again from the predetermined position and magnetic information is recorded/regenerated. As a result, the forward end portion of the film can be used effectively.

Furthermore, according to a still further embodiment of the present invention, a second detector for detecting perforations and the magnetic head are provided apart from the first detector. Here, the distance between the second detector/the magnetic head and the first detector is a multiple of a distance between frames. Recording and regenerating of magnetic information are carried out by the magnetic head every time one of the first and second detecting means detect the perforation. As a result, the magnetic information can be recorded in a predetermined magnetic layer in the forward end portion of the film.

BRIEF DESCRIPTION OF THE DRAWINGS

The exact nature of this invention, as well as other objects and advantages thereof, will be readily apparent from consideration of the following specification relating to a accompanying drawings, in which like reference characters designate the same or similar parts throughout the figures and wherein.

DESCRIPTION OF THE PREFERRED EMBODIMENT

Detailed description will hereunder be given of the preferred embodiment of a method and an apparatus for magnetic recording and regeneration according to the present invention with reference to the accompanying drawings.

Figure 1:
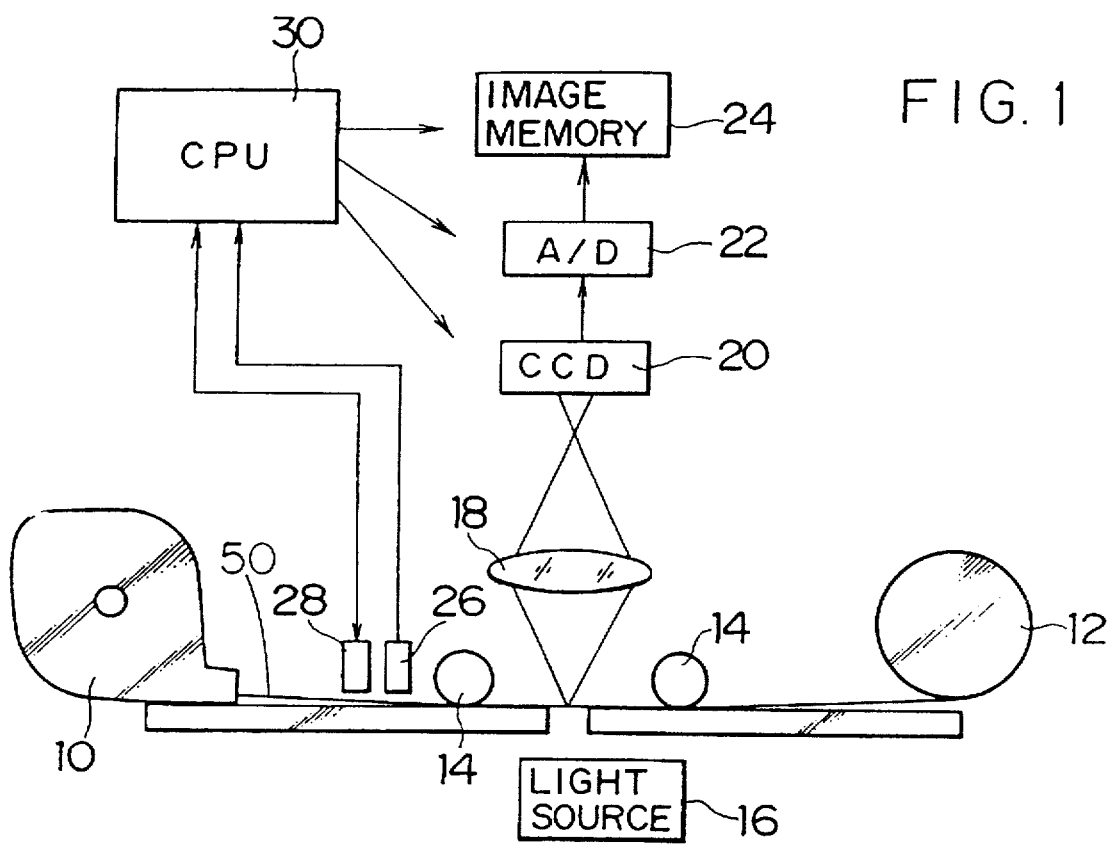
FIG. 1 is a view illustrating the first embodiment of a film scanner to which the method of magnetic recording and regeneration and the apparatus therefore are applied.

FIG. 1 is a view illustrating a first embodiment of a film scanner to which the method and the apparatus for magnetic recording and regeneration are applied.

The film scanner which is shown in FIG. 1 generally includes a film conveying part which conveys the film 50, an image reading part which picks up a film image and stores an image data in an image memory, a magnetic recording and regenerating part which writes and reads magnetic information, a frame detection part which detects each frame, and a CPU 30 which controls each of the above-mentioned parts. A detailed description of the film scanner will follow.

Figure 2:
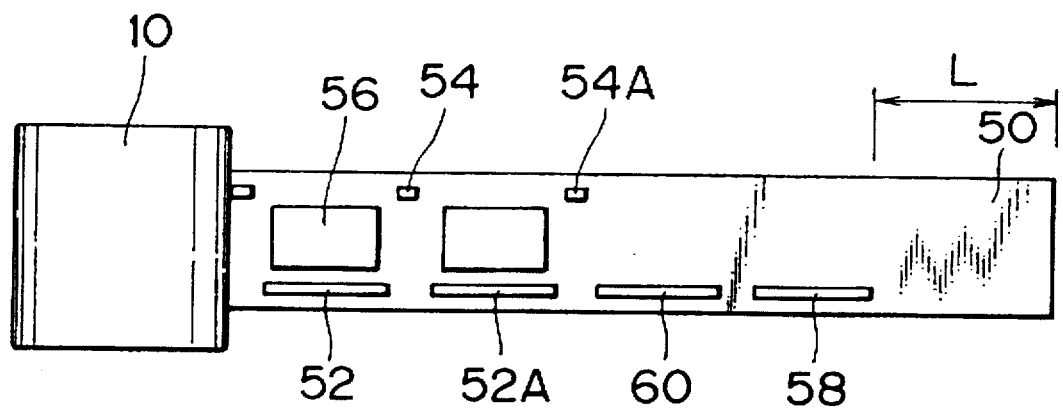
FIG. 2 is a view illustrating one example of a photographic film which is used in the present invention.

FIG. 2 is a view illustrating one example of a photographic film cartridge which is employed in the present invention. As shown in FIG. 2, in the film 50, a transparent magnetic substance coats the entire surface opposite to an emulsion surface, so that a magnetic layer is formed. A frame track 52 in which information relating to each frame to be recorded is disposed under each frame region 56 in the longitudinal direction of the film. A first leader track 58 and a second leader track 60 in which information relating to the whole film to be recorded is provided in the forward end portion of the film. "Frame track" and "Leader track" will be called "Magnetic track" in the following description.

Magnetic information is recorded on these magnetic tracks by a camera which has a magnetic head and a film scanner, etc. which are described below. The magnetic information to be recorded by the camera relate to, for example, photographing conditions, pseudo-zooming, a frame number, a print format which indicates one of high-vision, panoramic and normal, the date and time of photographing, and so forth.

The film 50 is wound up around a single spool (not shown in the drawing) which is provided within a film cartridge 10, so that the film can be housed.

A perforation 54 is a rectangular hole, and one perforation 54 is arranged between frames. Perforations are also formed before the first frame and after the last frame, and the number of perforations is one more than the number of frames. As a result, when the film 50 is rewound into the film cartridge 10, the perforation 54A which is closest to the forward end of the film can be used as a basis for magnetic recording in the leader tracks 58 and 60 at the forward end of the film 50.

In FIG. 1, the film conveying part comprises a film supplying part in which the film cartridge 10 is mounted, a film winding part (not illustrated) which winds up the film 50 carried from the film supplying part around a winding reel 12, and a capstan 14 which is arranged on the film carrying path and controls the film conveyance speed.

The image reading part comprises a light source 16 which illuminates a frame, a lens 18 which forms the film image illuminated by the light source 16 or a CCD line sensor 20, a CCD line sensor 20 which converts image light formed via the lens 18 into signal charge of R, G and B corresponding to the light strength, an A/D converter 22 which converts an image signal transmitted from the CCD line sensor 20 into a digital image signal, and an image memory 24 which stores the digital image signal transmitted from the A/D converter 22.

The magnetic recording and regenerating part includes a magnetic head 28. The magnetic head 28 reads out information written in the frame track 52 and the leader tracks 58 and 60 of the film 50, and writes the information in the frame track 52 and the leader tracks 58 and 60.

The frame detection part is composed of an optical sensor 26. The optical sensor 26 illuminates the film to detect reflection light, and detects the perforation 54 which is formed in each frame on the film 50.

The CPU 30 controls the film conveying part, the image reading part, and the magnetic recording and regenerating part in accordance with the position of the perforation detected by the optical sensor 26.

Next, one example of a processing procedure for the film scanner constructed in the above-mentioned manner will be explained.

When the film cartridge 10 housing a developed film is set in the film supplying part, the forward end of the film 50 is sent out from the film cartridge 10. The film 50 is conveyed to the film winding part by the capstan 14. The film 50 which has reached the film winding part is wound by the winding reel 12, and the film 50 is carried at a fixed speed from the film supplying part to the film winding part. At this time, the optical sensor 26 detects the perforation 54 corresponding to each frame, and positions of a picked-up frame region 56 and magnetic data regions 52 and 58 are determined in accordance with the detected perforation 54. And, the image data and the magnetic information are stored in the image memory 34 and RAM (which is not shown in the drawing) respectively by the image reading part and the magnetic data regeneration part. Then, the entire film 50 is conveyed up to the film winding part, and the image data and the magnetic information of all frames are stored in the image memory 24 and the RAM respectively.

Next, displayed on a monitor (which is not shown in the drawing) is an index screen which shows information relating to all frames, each frame and a film as a whole. When the user enters new information concerning each frame or a film as a whole in accordance with a predetermined procedure while looking at the screen, the contents in the RAM are accordingly replaced.

When the processing on the index screen is completed, the film 50 is rewound and the new information stored in the RAM is written in a magnetic layer of the film 50 by the magnetic head 28. At this time, the positions of the frame track 52, the leader track 58 and 60 are detected by the detection of the perforation 54. Then, the information concerning each frame is recorded in the frame track 52 which is provided in the vicinity of each frame, and the information relating to the film as a whole is recorded in the leader tracks 58 and 60 in the forward end portion of the film. The information relating to each frame are information concerning a frame number, a title, a print format (a high-vision image, a panoramic image and a normal image), the date and time, the number of prints ordered, the photographic conditions of AE data which indicates the brightness of each frame and the like. The information relating to the film as a whole are information concerning a material of the film, an ID number for telling the film from other cartridges, data which indicates the winding direction of the film such as normal winding and pre-winding during photographing.

As mentioned above, after new information is stored in the frame track 52, the leader tracks 58 and 60 of the film 50, the regeneration, etc. are carried out for the film in accordance with the information.

A detailed explanation will be given of a method of magnetic recording in the frame track 52 and the leader tracks 58 and 60 in the film 50.

Figure 4:
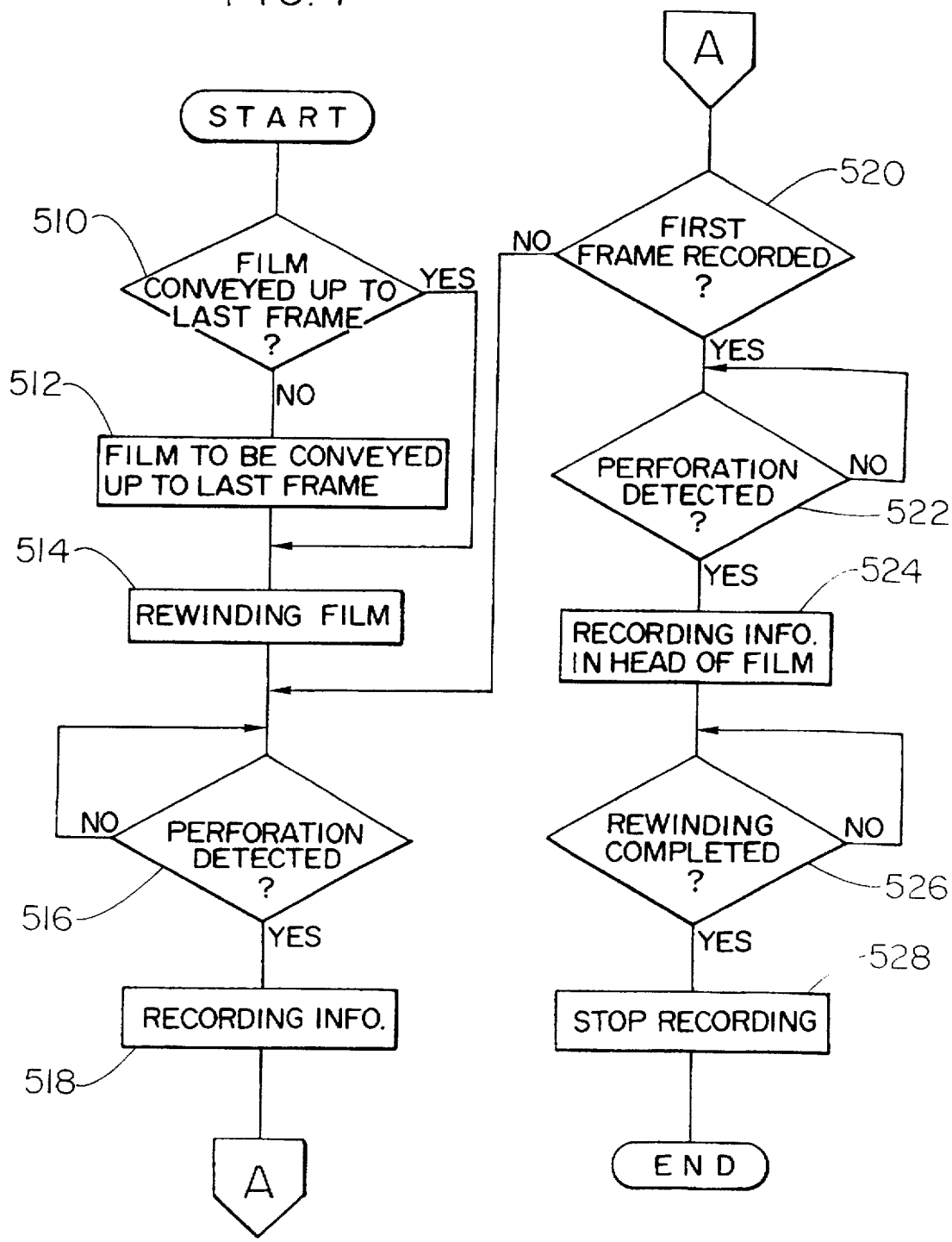
FIG. 4 is a flow chart illustrating a procedure in the method of magnetic recording in the film scanner of FIG. 1.

FIG. 4 is a flow chart illustrating the procedure in which information stored in the RAM is written in the frame track 52 and the leader tracks 58 and 60 of the film 50.

First, it is determined if the film 50 is wound up to the last frame around the winding reel 12 (S10). If not, the film is conveyed so as to be wound to the last frame (S12). Once the film is completely wound, rewinding of the film 50 starts from the film winding part into the film supplying part the, film cartridge 10 (S14)). When the optical sensor 26 detects a perforation 54 (S16), information relating to the frame which is carried after the detected perforation 54 is read out from the RAM, and is recorded in the frame track 52, which is located under the frame, by the magnetic head 28 (S18).

Moreover, it is detected whether or not the writing of the information relating to the frame which is closest to the forward end of the film (first frame) is completed (S20). In the case that it is not completed, the operation returns to the step S16, and the processing from the step S16 to S20 is repeated. As a result, the information relating to each frame is recorded in the frame track 52 corresponding to each frame. On the other hand, after the writing of the information relating to the first frame is completed, the first perforation 54 is detected (S22). Because the detected perforation 54 is a perforation which is closest to the forward end of the film, the information concerning the whole film is written in the leader tracks 58 and 60 in the forward end portion of the film (S24). Then, the entire film 50 is wound into the film cartridge 10 (S26), so that the recording is completed (S28).

The explanation was given of the method of magnetic recording in the case when the film is rewound. As for a method of magnetic recording, there is another method which is carried out when the film is fed. However, it is more advantageous to carry out the magnetic recording when the film is rewound. Next, an explanation will be given of this advantage.

Figure 5:
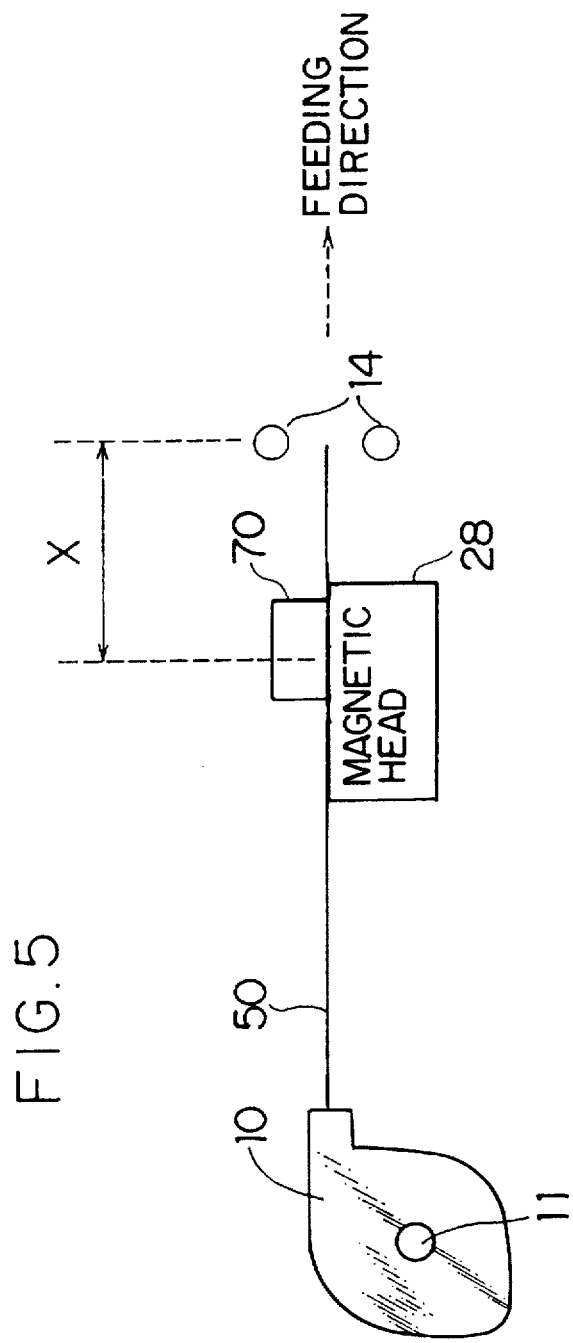
FIG. 5 is a view illustrating the positional relationship between the magnetic head and the capstan in the film scanner of FIG. 1.

FIG. 5 is a view illustrating a positional relationship between the capstan and the magnetic head.

As shown in FIG. 5, when the film 50 is sent out from the film cartridge 10, a spool 11 within the film cartridge 10 is rotated in the feeding direction of the film so that the forward end of the film can be fed from the film cartridge 10. After the forward end of the film reaches the capstan 14, the film is carried out by the drive force of the capstan 14.

The magnetic head 28 is provided between the capstan 14 and the film cartridge 10, and carries out the magnetic recording while the film 50 passes between a pad 70 for pushing the head and the magnetic head 28.

X is indicative of a distance between the capstan 14 and the magnetic head 28.

As shown in FIG. 5, in the case that the magnetic recording is performed when the film is sent out, the forward end of the film 50 passes the magnetic head before reaching the capstan 14. If the magnetic recording was started from the forward end portion of the film 50, the film 50 could not easily pass the magnetic head because the film 50 is pushed by the magnetic head 28 and the pad 70. As a result, the film 50 becomes loose, and jamming and the like are caused. To avoid these problems, the magnetic recording has to be started after the forward end of the film 50 reaches the capstan 14. However, in the case that the magnetic recording is started after the forward end of the film 50 reaches the capstan 14, it is impossible to perform magnetic recording on the magnetic region in the forward end portion between the forward end of the film 50 and a position apart from the forward end. Accordingly, to use the magnetic record region in the forward end portion of the film 50 sufficiently, the distance X between the magnetic head 28 and the capstan 14 should be short as much as possible. In this case, however, the arrangement of the magnetic head 28 and the capstan 14 is limited.

On the other hand, just like the method of magnetic recording in the above-mentioned embodiment in the present invention, in the case that the magnetic recording is performed when the film is rewound, the film 50 is conveyed while being pulled by the spool 11 in the driven film cartridge 10. Therefore, the problem of jamming and the like can be avoided. As a result, in this embodiment, the arrangement of the magnetic head 28 is not regulated, and the recording can be completely carried out up to the forward end of the film 50.

As mentioned above, it is more advantageous to carry out the magnetic recording once the film is wound than after the film is rewound.

The method of magnetic recording in the film scanner was described in the first embodiment, but the method of magnetic recording should not be only used in the film scanner.

For example, in a camera with a so-called rewinding system, the entire film is wound around a winding axis, and then the film is rewound into the film cartridge one frame by one every time a photographing is performed. Therefore, the writing of magnetic information can be carried out when the film is rewound by one frame for the next photographing just as in the above-mentioned method of magnetic recording. Also, in the camera of a normal-winding system, the method of magnetic recording in the above-mentioned embodiment can be employed after the photographing of all frames is over.

Figure 3:
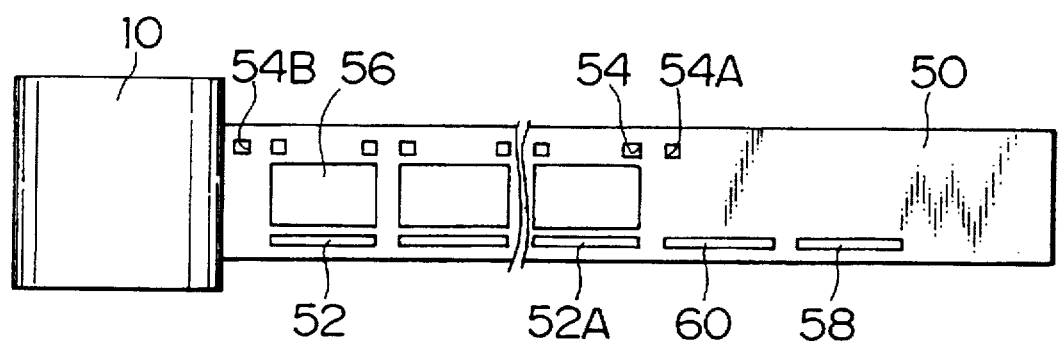
FIG. 3 is a view illustrating the other example of a photographic film which is employed in the present invention.

In the method of magnetic recording in the present invention, the film in which two perforations are formed for each frame as shown in FIG. 3 can be used as well as the film in which one perforation is formed for each frame as shown in FIG. 2. In the film 50 of FIG. 3, perforations 54 are formed beside the front and back ends of each frame, and a perforation 54A is formed at the front of the first frame, and a perforation 54B is formed at the back of the last frame. That is, when the number of frames on a roll of film is N ("N" is an integer), 2(N+1) perforations are formed on the film 50. When the above-mentioned method of magnetic recording is applied to this film, the writing of the magnetic information is performed every time an odd number perforation is detected, or every time an even number perforation is detected.

Figure 6:
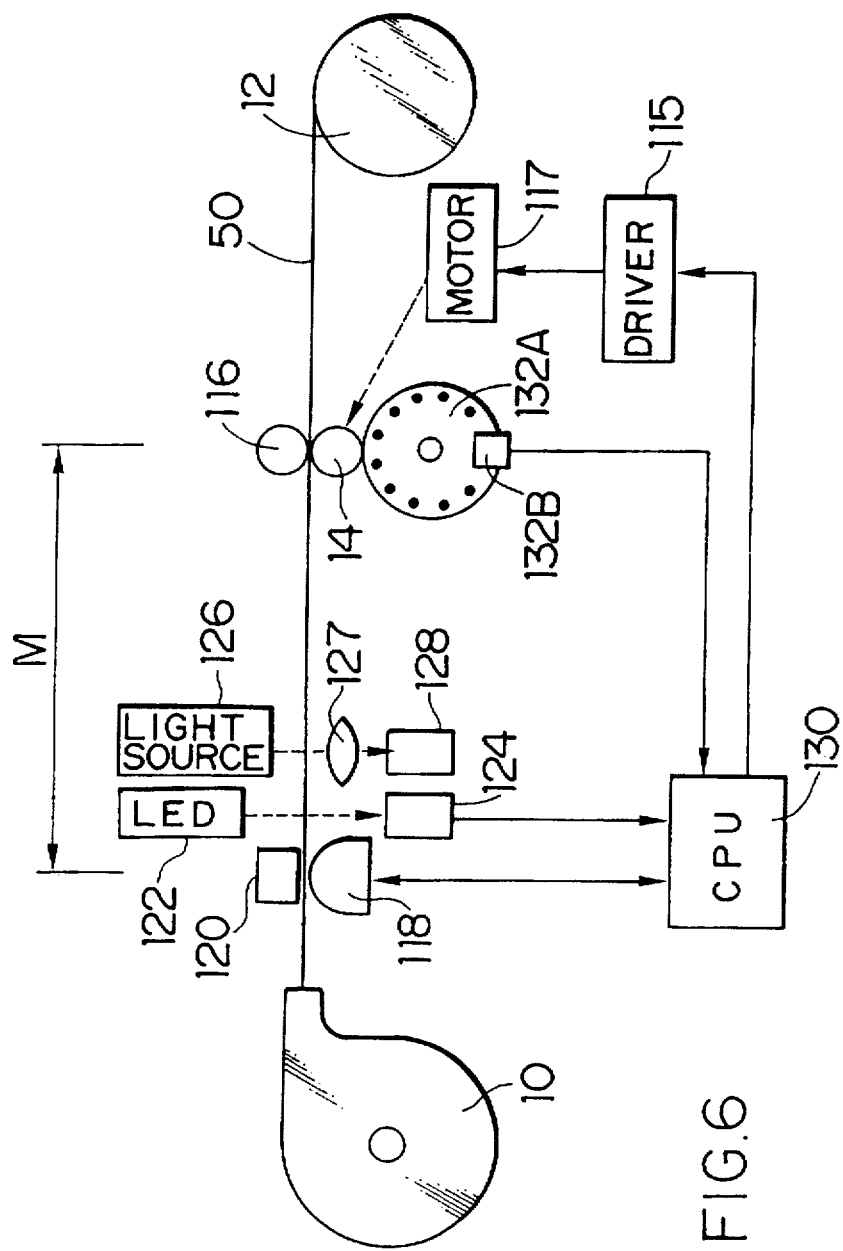
FIG. 6 is a view illustrating a second embodiment of the film scanner to which the method and apparatus for magnetic recording and regeneration are applied.

FIG. 6 is a view illustrating a second embodiment of the film scanner to which the method and the apparatus for the magnetic recording and regeneration are applied. The same numerals are put on the parts common to those of FIG. 1, and a detailed explanation is omitted here.

As shown in FIG. 6, the film cartridge 10 illustrated in FIG. 2 is mounted in the film supplying part, and the film 50 which is sent out from the film cartridge 10 is conveyed on the film conveying path to be wound around the winding reel 12 of the film winding part. The capstan 14 (which controls the conveyance speed of the film), a perforation sensor 124, a CCD line sensor 128, a magnetic head 118, etc. are provided on the film carrying path.

The film 50 is conveyed through and between the capstan 14 and a pinching roller 116. A pulse generating rotational plate 132A is connected to the capstan 14 in such a manner that it rotates together with the capstan 14. A pulse generating device 132B transmits a pulse to a CPU 130 every time the rotational plate 132A rotates by a predetermined angle. By counting the pulse, the distance in which the film 50 is conveyed can be detected. A detailed explanation about it will be given later. The pulse is also used for the detection of the film conveyance speed. The CPU 130 transmits a control signal for a capstan motor 117 to convey the film 50 at a predetermined speed via a driver 115.

The perforation sensor 124 optically detects the perforation 54 of the film 50. A light-emitting diode 122 faces the perforation sensor 124 across the film conveying path. The light from the light-emitting diode 122 is detected by the perforation sensor 124 only when the light passes through the perforation 54 which is provided in the film 50. Accordingly, when the perforation sensor 124 detects the light from the light-emitting diode 122, one of the perforation 54 in the film 50 faces the perforation sensor 124 across the film conveying path, so that a frame and a magnetic track which correspond to the perforation 54 can be determined.

Moreover, the perforation sensor 124 has a predetermined positional relationship with the magnetic head 118. The magnetic head 118 starts writing or reading magnetic information at the same time as when the perforation 54 of the film 50 is conveyed in the feeding direction. As described above, the recording and regenerating magnetic information in the magnetic track are carried out.

The CCD line sensor 128 is provided perpendicular to the film conveyance direction, and picks up a frame image on the film 50. A light source 126 is a long fluorescent light, and is provided in the direction perpendicular to the film conveyance direction. The light source 126 illuminates the film 50 being conveyed. Then, the image light which was transmitted through the film 50 is formed on a light-accepting surface of the CCD line sensor 128 through a taking lens 127. The image light which is formed at the CCD line sensor 128 is converted into an electric signal. Then, various kinds of signal processing are performed on the electric signal, which is transmitted as a video signal to an image display apparatus (not shown). As a result, the frame image is displayed on the image display apparatus.

The magnetic head 118 writes magnetic information in the film 50 which is pushed by the pad 120, and reads out the magnetic information of the film 50. The magnetic head 118 is provided in such a manner that a distance between the magnetic head and the capstan 14 (a distance M which is shown in FIG. 6) is shorter than a distance L which is shown in FIG. 2. The distance L indicates a distance between the forward end of the film 50 and the forward end of a first leader track 58. The reason why the arrangement is restricted is that at least the forward end of the film needs to reach the capstan 14 and the film 50 has to be conveyed by the capstan 14 at a fixed speed so as to perform the reading and writing of magnetic information in the first leader track 58 at the time of feeding the film 50.

Next, an explanation will be given of the operation of the film scanner in the case when the magnetic information is recorded in the magnetic track at the time of feeding the film. The magnetic information has been set before being recorded in the magnetic track, and the magnetic information is stored in a storage memory within the film scanner. When being written in the magnetic track, the magnetic information which corresponds to each magnetic track is read out from the storage memory and the readout information is recorded in the magnetic track.

The state of the film in the case when the recording of magnetic information is started differs in accordance with the processing which is carried out before the recording of the magnetic information. For example, the entire film 50 is wound up in the film supplying part, the film 50 is wound up in the film winding part up to the last frame, or the film 50 is being wound in the film winding part up to a middle frame.

First, in the case where the first perforation 54A which is provided closest to the forward end of the film 50 is to the left of the perforation sensor 124 in FIG. 6, the film 50 is conveyed in the feeding direction to detect the first perforation 54A. On the other hand, when the first perforation 54A is to the right of the perforation sensor 124 in FIG. 6, the film 50 is conveyed in the rewinding direction to detect the first perforation 54A. After the perforation 54A is detected, the film 50 is conveyed in the rewinding direction. The CPU 130 counts the pulse, which is transmitted from the pulse generating device 132B every time the plate 132A rotates by a predetermined angle, and it observes how much the film 50 is rewound after the detection of the perforation 54A. When the CPU 130 detects that the perforation 54A reaches the position of the magnetic head 118, the film 50 is rewound as described hereinafter and is subsequently conveyed in the feeding direction so that the magnetic information can be written in the first leader track 58.

In further detail, when perforation 54a is determined to be located at magnetic head 118, the film is conveyed in the rewind direction. When CPU 130 detects that the film 50 is rewound by two frames, it changes the film carrying direction to the feeding direction, and starts writing the magnetic information in the first leader track 58.

Next, the CPU 130 counts the pulse from the pulse regenerating device 132B, and detects the forward end of the second leader track 60, and starts writing the magnetic information in the second leader track there.

When the recording in the second leader track 60 is over, the first perforation 54A is detected again. At this time, the CPU 130 starts writing the magnetic information, and the magnetic information is recorded in a frame track 52A which corresponds to the first frame.

After that, the perforation sensor 124 detects each perforation 54, and the magnetic information concerning each frame which corresponds to the perforation 54 is recorded in each frame track 52.

As described above, the control of the film carrying, which is performed when the magnetic information is recorded in the magnetic track, is also carried out when the magnetic information which is recorded in the magnetic track of the film 50 is regenerated. Therefore, the magnetic data at the forward end of the film, where a perforation is not formed, can be regenerated.

In the second embodiment, there is no principle restriction to arrange each device close to each other on the film conveyance path. Therefore the entire apparatus can be small size.

Next, an explanation will be given of a third embodiment of the present invention.

Figure 7:
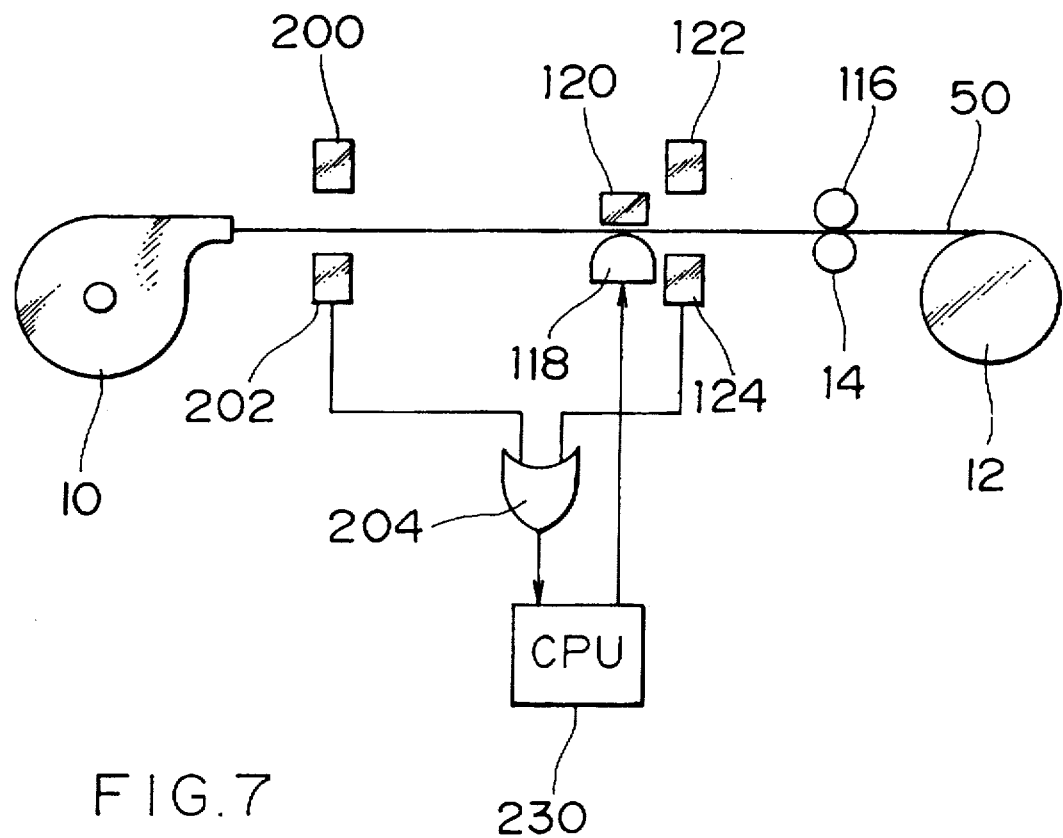
FIG. 7 is a view illustrating a third embodiment of the film scanner to which the method and the apparatus for magnetic recording and regeneration are applied; and, FIGS. 8(A), 8(B), 8(C) and 8(D) are timing charts of signals which are transmitted from each part of the film scanner of FIG. 7.

FIG. 7 is a view illustrating a third embodiment of the film scanner. The same numerals are put on the same parts as those of the second embodiment in FIG. 6, and a detailed explanation is omitted here.

In FIG. 7, a light-emitting diode 200 and a perforation sensor 202 are newly provided on the film carrier path. They are not provided in the above-mentioned second embodiment. The light-emitting diode 200 and the perforation sensor 202 are provided on the film supplying part away from the perforation sensor 124. The distance between the perforation sensor 124 and the light-emitting diode 200/the perforation sensor 202 corresponds to that of two(2) frames.

Two sensors 124 and 202 detect the perforations while the film is being conveyed, and send signals indicating that the perforations are detected to an OR gate 204. Then a signal indicating the logical OR of input signals from the perforation sensor 124 and 202 is transmitted from OR gate 204 to CPU 230.

When receiving the signal, the CPU 230 makes the magnetic head 118 write/read out magnetic information in/from the magnetic track which reaches at the magnetic head 118.

FIG. 8 is a timing chart illustrating the state of a signal from the perforation sensors 124 and 202 and the magnetic track which passes the magnetic head 118 in the case when the magnetic recording and regenerating is carried out by conveying the film 50 in the feeding direction.

First, when the film 50 is conveyed in the feeding direction, the first perforation which is formed at the head of the film 50 is detected by the perforation sensor 202 (No.1 in FIG. 8(A)). On the other hand, the perforation sensor 124 does not detect the first perforation at this time as shown in FIG. 8(B). The OR gate 204 sends a signal indicating detection of the perforation by the perforation sensor 202 to the CPU 230 (FIG. 8(C)). At this moment, the first leader track 58 reaches at the magnetic head 118 (refer to FIG. 8(D)). As a result, the reading/writing of magnetic information for the first leader track 58 is carried out.

Next, the second perforation is detected by the perforation sensor 202 (No.2 in FIG. 8(A)). At this time, the perforation sensor 124 does not detect the perforation as shown in FIG. 8(B). The OR gate 204 sends a signal indicating detection of the perforation to the CPU 230 (FIG. 8(C)) because the perforation sensor 202 detects the perforation. At this time, the second leader track 60 arrives at the magnetic head 118 (refer to FIG. 8(D)). As a result, the magnetic information is read out/written in the second leader track 60.

When the film 50 is further conveyed, the third perforation is detected by the perforation sensor 202 (No.3 in FIG. 8(A)). At the same time, the first perforation which is provided on the head of film 50 is detected by the perforation sensor 124 (No.1 in FIG. 8(B)). At this time, the frame track 52 of the frame corresponding to the first perforation which is detected by the perforation sensor 124 reaches the magnetic head 118. As a result, the magnetic information is read out/written in the frame track 52.

After this, the frame track 52 which corresponds to the perforation detected by the perforation sensor 124 reaches the magnetic head 118 every time the OR gate 204 generates the signal indicating the detection of the perforation. Therefore the magnetic information is read out/written in the magnetic track 52.

That is, after the perforation sensor 124 starts detecting the perforation, the frame track 52 which corresponds to the perforation detected by the perforation sensor 124 reaches the magnetic head 118. Therefore, when the signal is transmitted from the perforation sensor 124, the magnetic information relating to a frame which corresponds to the perforation 54 detected by the perforation sensor 124 is recorded.

The film 50 of FIG. 2 has forty frames and forty-one perforations. Therefore, a signal which indicates the detection of the perforation is transmitted forty-one times from the perforation sensors 124 and 202.

As mentioned above, the first and second leader tracks 58 and 60, which are located in the forward end portion of the film where the perforation 54 is not formed, are detected by the perforation sensor 202. As shown in the timing chart of FIG. 8(C) the output signal from the OR gate 204 is generated as if the perforation was provided for the leader track 58 and 60. Therefore magnetic information can be recorded/regenerated in the forward end portion of the film 50 in the simple sequence in which the writing/reading of magnetic information is performed with the output of the signal indicating the detection of the perforation from the OR gate 204. As a result, it is not necessary to provide a special sequence for the writing/reading magnetic information in the forward end portion of the film 50.

In this embodiment, the perforation sensor 124 and the magnetic head 118 are provide two frames apart from the perforation sensor 202. Actually, the perforation sensor and the magnetic head are provided in such a manner that the total number of the output signals from the OR gate to indicate the detection of the perforation is more than the number of magnetic tracks on the film 50.

That is, the first leader track is required only to reach the magnetic head 118 after the first output of the signal that indicate detection of the perforation from the OR gate 204.

For example, the perforation sensor 124 and the light source 122 of FIG. 7 can be moved in the feeding direction (that is, the right direction of FIG. 7) by one frame. In this case, in a timing chart of FIG. 8, when the perforation sensor 202 detects the fourth perforation of the film, the perforation sensor 124 detects the first perforation. Therefore, the total number of output signals from the OR gate 204 to indicate the detection of perforations is 44.

As has been described above, according to the present invention, the magnetic recording of a film in which magnetic information can be recorded is performed when the film is rewound, so that the magnetic recording for the magnetic region on the forward end portion of the film in which the perforations is not provided is performed in similar procedure for the film except for the forward end portion.

According to another embodiment of the present invention, the film is conveyed in the feeding direction and the perforation which is closest to the forward end of photographic is detected. Then, it is observed how much the film is conveyed, and the film is rewound up to the position of the magnetic track at the head of the film. From that position, the magnetic information is recorded and regenerated. In another embodiment of the present invention, two detectors for detecting perforations are provided in such a manner that one detector is apart a predetermined distance from another. When one of the detectors detects the perforation, information is recorded in the magnetic region. As a result, it is not necessary to provide the perforation so as to determine the magnetic track at the head of the film. Furthermore, the magnetic recording/regenerating for the head of the film is performed accurately in a simple sequence.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of magnetic recording which is applied to a film cartridge winding a photographic film which has a magnetic layer and perforations indicating a reference position of each frame around a single spool, comprising the steps of:

rewinding the photographic film into the film cartridge;

detecting the perforations, which include respective single perforations formed between frames, one perforation formed before a first frame and one perforation formed after a last frame, at the time of said step of rewinding; and recording information which corresponds to the detected perforations in the magnetic layer during rewinding of the photographic film, a number of frames recorded on the photographic film being N, such that N is an integer, N+1 perforations being formed on the photographic film, every time a perforation is detected, information relating to a frame following the detected perforation is recorded in the magnetic layer, including detection of an Nth perforation, and when an (N+1)th perforation is detected, information relating to the photographic film as a whole is recorded in the magnetic layer.

2. The method of magnetic recording of claim 1, wherein when the (N+1)th perforation is detected, the information relating to the photographic film as a whole is recorded in a track in the magnetic layer of a leader portion of the photographic film, the leader portion of the photographic film having no perforations formed therein.

3. The method of magnetic recording of claim 2, further comprising recording additional information relating to the photographic film as a whole in a second track in the magnetic layer in the leader portion of the photographic film subsequent recording of the information relating to the photographic film as a whole.

4. The method of magnetic recording of claim 1, wherein each frame has a predetermined frame length, the information relating to the photographic film as a whole being recorded in the magnetic layer within a distance from the (N+1)th perforation which is less than the predetermined frame length.

5. A method of magnetic recording and regenerating in which a film conveyer feeds a photographic film.

6. The method of magnetic recording and regenerating according to claim 5, wherein said film conveyer includes a capstan for conveying said photographic film at a fixed speed.

7. The method of magnetic recording and regenerating according to claim 5, wherein a pulse generator which generates a pulse signal at the time of conveying said photographic film and a counter which counts the pulse signal generated by said pulse generator are provided; and said required length is determined by counting pulse signals after a detection of the first perforation.

8. An apparatus for magnetic recording and regeneration, comprising:

means for conveying a photographic film having a magnetic layer and perforations indicating a reference position of each frame at a predetermined speed;

first detecting means for detecting said perforations;

second detecting means for detecting said perforations, said second detecting means being provided at a position apart from said first detecting means by a multiple of a distance between frames in a film feed direction;

a magnetic head for recording/regenerating information in the magnetic layer corresponding to each frame and the magnetic layer on a forward end portion of said photographic film in which a perforation is not provided; and means for making said magnetic head record and regenerate information every time at least one of said first and second detecting means detect a perforation.

9. A method of recording on photographic film having, a leader portion, a magnetic layer and a plurality of perforations indicating respective reference positions of each frame of the photographic film, the photographic film being wound from a film cartridge, comprising the steps of:

rewinding the photographic film into the film cartridge;

detecting the perforations, including two respective perforations formed for each frame which respectively indicate a forward end and a rear end of a frame, a perforation formed before a first frame and a perforation formed after a last frame, during said step of rewinding; and recording information which correspond to the detected perforations in the magnetic layer of the photographic film, a number of frames recorded on the photographic film being N, such that N is an integer, 2N+2 perforations being formed on the photographic film, every time an even-numbered perforation is detected, information relating to a frame following the detected even-numbered perforation is recorded in the magnetic layer, including detection of a 2Nth perforation, and when a (2N+2)th perforation is detected, information relating to the photographic film as a whole is recorded in the magnetic layer in the leader portion, the leader portion having no perforations formed therein.

10. A method of recording/reproducing data on a magnetic layer of photographic film which includes a plurality of frames and a plurality of perforations which indicate corresponding reference positions of each of the frames, the photographic film being wound within a film cartridge, comprising the steps of:

a) prefeeding the photographic film from the film cartridge toward a take-up spool;

b) detecting a first perforation closest to a forward end of the photographic film during said step a);

c) rewinding the photographic film by a predetermined length after detection of the first perforation in said step b);

d) feeding the photographic film after completion of said step c); and e) recording/reproducing the data on the magnetic layer of the photographic film during said step d).

11. The method of recording/reproducing of claim 10, wherein said steps a), c) and d) comprise conveying the photographic film at a fixed speed with a capstan.

12. The method of recording/reproducing of claim 10, wherein said step c) comprises:

c1) rewinding the photographic film;

c2) generating a pulse representative of rewinding of the photographic film during said step c1) by a unit distance;

c3) counting the generated pulses; and c4) stopping rewinding of said step c1) upon determination that the counted pulses equal a predetermined number, the predetermined length equaling the predetermined number of unit distances.

13. A method of recording/reproducing data on a magnetic layer of photographic film which includes a plurality of frames and a plurality of perforations which indicate corresponding reference positions of each of the frames, the photographic film being wound within a film cartridge, comprising the steps of:

a) feeding the photographic film from the film cartridge to a take-up spool;

b) rewinding the photographic film from the take-up spool toward the film cartridge;

c) detecting a first perforation closest to a forward end of the photographic film during said step b);

d) rewinding the photographic film by a predetermined length after detection of the first perforation in said step c);

e) feeding the photographic film after completion of said step d); and f) recording/reproducing the data on the magnetic layer of the photographic film during said step e).

14. The method of recording/reproducing of claim 13, wherein said steps a), b), d) and e) comprise conveying the photographic film at a fixed speed with a capstan.

15. The method of recording/reproducing of claim 13, wherein said step d) comprises:

d1) rewinding the photographic film;

d2) generating a pulse representative of rewinding of the photographic film during said step d1) by a unit distance;

d3) counting the generated pulses; and d4) stopping rewinding of said step d1) upon determination that the counted pulses equal a predetermined number, the predetermined length equaling the predetermined number of unit distances.

16. A method of recording on photographic film having a leader portion, a magnetic layer and a plurality of perforations indicating respective reference positions of each frame of the photographic film, the photographic film being wound from a film cartridge, comprising the steps of:

rewinding the photographic film into the film cartridge;

detecting the perforations, including two respective perforations formed for each frame which respectively indicate a forward end and a rear end of a frame, a perforation formed before a first frame and a perforation formed after a last frame, during said step of rewinding; and recording information which correspond to the detected perforations in the magnetic layer of the photographic film, a number of frames recorded on the photographic film being N, such that N is an integer, 2N+2 perforations are formed on the photographic film, every time an odd-numbered perforation is detected, information relating to a frame following the detected odd-numbered perforation is recorded in the magnetic layer, including detection of a (2N−1)th perforation, and when a (2N+2)th perforation is detected, information relating to the photographic film as a whole is recorded in the leader portion, the leader portion having no perforations formed therein.

17. A method of recording on photographic film having a leader portion, a magnetic layer and a plurality of perforations indicating respective reference positions of each frame of the photographic film, the photographic film being wound from a film cartridge, comprising the steps of:

rewinding the photographic film into the film cartridge;

detecting the perforations during rewinding, the photographic film including respective single perforations formed between frames, one perforation formed before a first frame and one perforation formed after a last frame such that N+1 perforations are formed in the photographic film;

recording information in the magnetic layer of the photographic film during rewinding each time a perforation is detected, information relating to the photographic film as a whole being recorded in the magnetic layer in the leader portion upon detection of the (N+1)th perforation, the leader portion having no perforations formed therein.

18. The method of recording of claim 17, wherein the information relating to the photographic film as a whole is recorded in a first track, the method of recording further comprising recording additional information relating to the photographic film as a whole in a second track in the leader portion.

19. The method of recording of claim 18, wherein the first track is recorded in a first area of the leader portion immediately adjacent the (N+1)th perforation and the second track is recorded in a second area of the leader portion located subsequent the second area.

20. The method of recording of claim 17, wherein each frame has a predetermined frame length, the information relating to the photographic film as a whole being recorded in the leader portion within a distance from the (N+1)th perforation which is less than the predetermined frame length.

* * * * *